Oct. 16, 1945.  M. VALDASTRI, SR  2,386,993
METHOD OF AND APPARATUS FOR MAKING RAVIOLI
Filed July 5, 1944  2 Sheets-Sheet 1
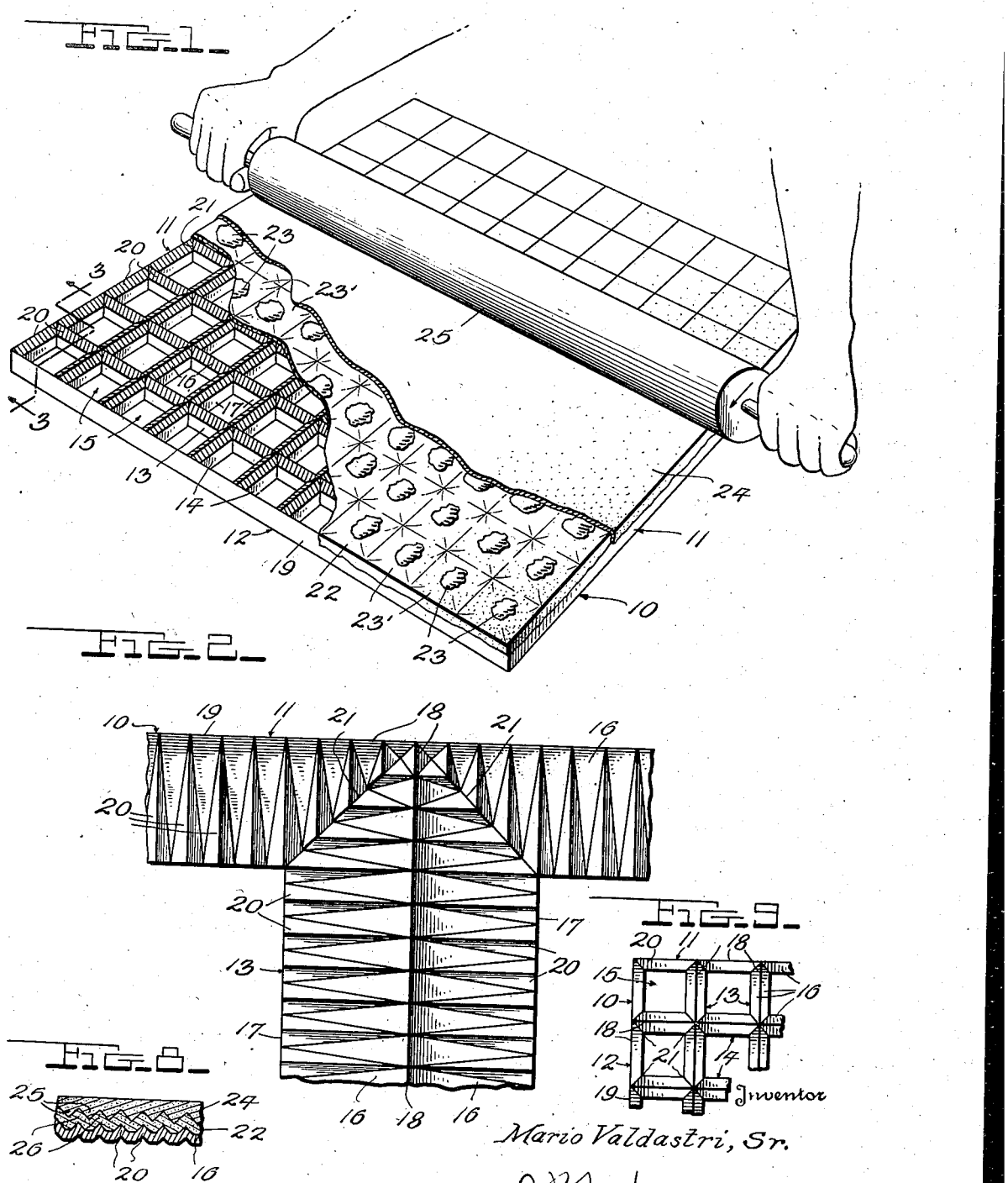

Oct. 16, 1945. M. VALDASTRI, SR 2,386,993
METHOD OF AND APPARATUS FOR MAKING RAVIOLI
Filed July 5, 1944  2 Sheets-Sheet 2
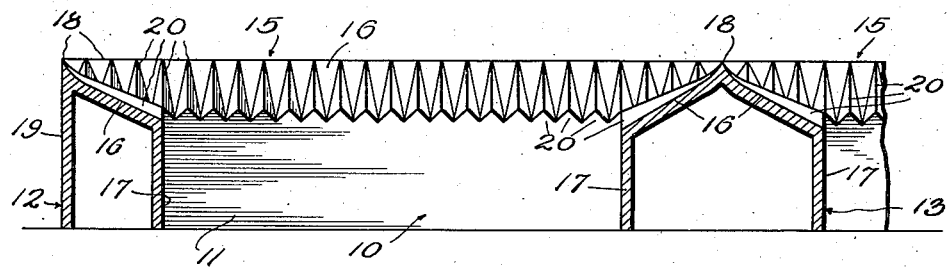
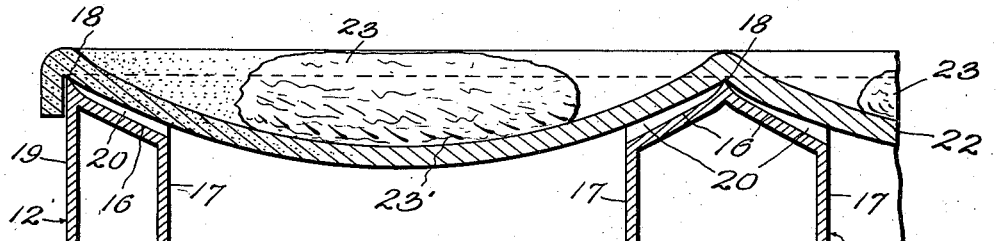
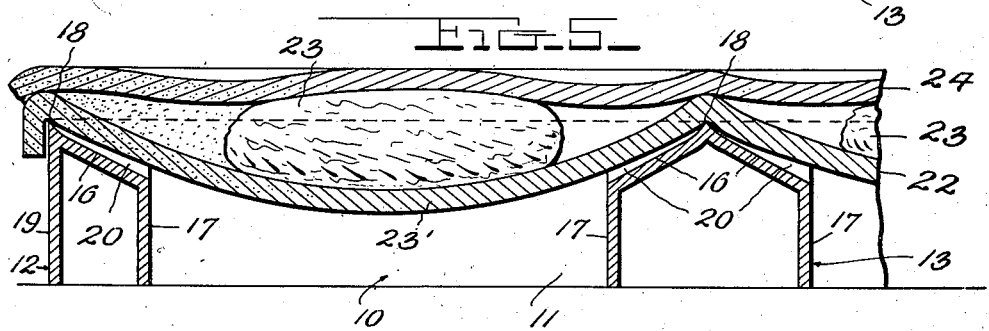
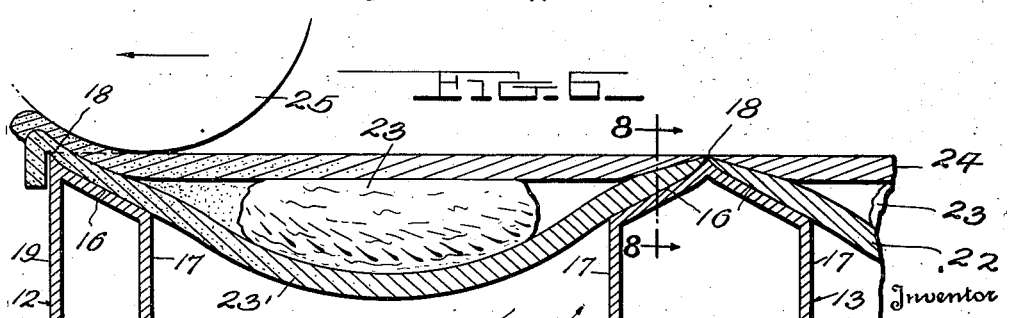
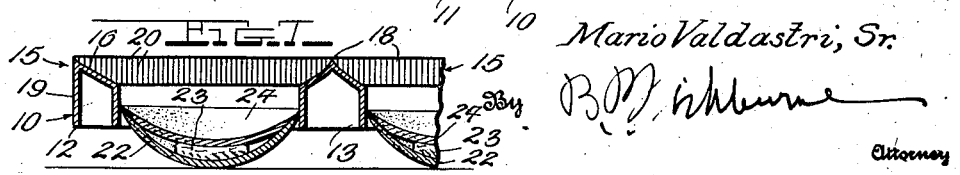
Inventor
Mario Valdastri, Sr.
By
Attorney Patented Oct. 16, 1945

2,386,993

UNITED STATES PATENT OFFICE 2,386,993

METHOD OF AND APPARATUS FOR MAKING RAVIOLI

Mario Valdastri, Sr., Kailua, Island of Oahu, Territory of Hawaii

Application July 5, 1944, Serial No. 543,568

3 Claims. (Cl. 107—54)

My invention relates to a method of and apparatus for producing ravioli.

An important object of the invention is to provide a method of the above mentioned character whereby the layers of dough constituting the ravioli casing will have their marginal contacting edge portions crimped for interfitting engagement and thereby securely bonded together, so that the casing will not open during the cooking of the product.

A further object of the invention is to provide a method which will prevent the grease or the like from the filling passing between the contacting marginal edge portions of the casing layers.

A further object of the invention is to provide a method of the above mentioned character which will form the completed ravioli and cause the same to be deposited upon a table or the like.

A further object of the invention is to provide apparatus for the practice of the method, whereby a large number of ravioli may be produced quickly and economically.

Other objects and advantages of the invention will be apparent during the course of the following description:

In the accompanying drawings, forming a part of this application, and in which like numerals are employed to designate like parts throughout the same:

Figure 1 is a perspective view of apparatus embodying my invention and used in the practice of my method, Figure 2 is an enlarged fragmentary plan view of a portion of the forming frame, Figure 3 is an enlarged vertical section taken on line 3—3 of Figure 1, Figure 4 is a similar view, showing the upper layer of dough applied to the frame and depressed to produce the pockets, with the filling within the pockets, Figure 5 is a similar view showing the upper layer of dough applied to the lower layer and the filling, Figure 6 is a similar view, showing pressure applied to the superposed layers to compress their marginal edge portions and sever the same, Figure 7 is a similar view, upon a reduced scale, showing the mold raised to separate out the formed ravioli, Figure 8 is an enlarged detailed section through the contacting marginal edge portions of the upper and lower layers, showing the interfitting arrangement, taken on line 8—8 of Figure 6, and Figure 9 is a fragmentary plan view of the forming frame, upon a reduced scale.

In the drawings, wherein for the purpose of illustration is shown a preferred embodiment of my invention, the numeral 10 designates a forming frame or unit, including marginal bars 11 and 12 and inner bars 13 and 14. The bars 11 and 12 are arranged at a right angle to each other, and the bars 13 and 14 are disposed at a right angle to each other. The bars 13 are at a right angle to the bars 11 and the bars 14 are at a right angle to the bars 12. These various bars are arranged to form a plurality of molds or forming elements 15. Each forming element is provided with upper faces 16, which are vertically inclined and extend downwardly toward inner vertical faces 17. The faces 16 diverge upwardly toward the upper cutting edges 18, and certain of these cutting edges are adjacent to outer vertical walls 19. The faces 16 are provided with raised ribs or teeth 20, which are V-shaped in cross section and taper upwardly. These ribs or teeth are also tapered longitudinally toward their outer ends and these outer ends merge into the cutting edge 18. The faces 16, at the corners of the mold, form diagonal lines 21. The ribs or teeth 20 of the two adjacent faces 16, at each diagonal line 21, register and merge into each other. The diagonal line 21 follows the inclination of the faces 16.

In the practice of the method, a layer of dough 22 is arranged over the several molds 15, Figures 1 and 4, and is depressed by hand to produce pockets 23' extending downwardly slightly into the several molds. The filling 23, which is usually a meat filling, is now placed within each pocket and is arranged inwardly of the marginal end portion of the casing to be formed. A second layer of dough 24 is now arranged upon the first layer, Figures 1 and 5. A rolling pin 25, Figures 1 and 6, is now arranged upon the upper layer 24 and is rolled over the same, with suitable downward pressure. This rolling action and downward pressure of the rolling pin causes the marginal edged portions of the layers of dough 22 and 24 to be brought into firm engagement, and the teeth 20 produce interfitting teeth or ribs 25 and 26, in the layers 22 and 24, as clearly shown in Figure 8. The contacting marginal edged portions of the layers 22 and 24 are thereby crimped, corrugated, or brought into interfitting relation. This secures a strong union between the contacting marginal edge portions, whereby the casing will not readily open during cooking. This action of the rolling pin also severs the marginal edge portions of the upper and lower layers 22 and 24. Each completed ravioli is therefore severed and separated out. Each completed ravioli may remain suspended within its mold, or it may gravitate downwardly into the same and rest upon the table. The frame 10 is now tapped, which may be done before, after, or during the raising of the frame. When the frame is thus raised, each ravioli will remain upon the table.

It is to be understood that the form of my invention hereto shown and described is to be taken as a preferred example of the same, and that various changes in the shape, size, and arrangement of parts, may be resorted to without departing from the spirit of my invention or the scope of the subjoined claims.

Having thus described my invention, what I claim is:

1. Apparatus for making ravioli, comprising a substantially flat frame including a plurality of molds, each mold including upper wide faces which are vertically inclined downwardly in an inner direction, said faces having upwardly tapering ribs extending transversely of the faces, the faces having cutting edges at their tops, the faces being adapted to receive layers of dough, the faces being adapted for coaction with pressure means to force the layers of dough toward the faces.

2. Apparatus for making ravioli, comprising a polygonal frame, the frame having wide inclined supporting faces which diverge upwardly and are provided at their top with cutting edges, each face having upwardly tapering teeth extending transversely of the face and which are longitudinally tapered toward the blade, the faces being adapted to receive thereon layers of dough, the faces being adapted for coaction with pressure means to force the layers of dough toward the faces.

3. The method of forming ravioli, comprising arranging a layer of dough generally horizontally and supporting in a downwardly inclined manner portions of the layer for providing downwardly inclined marginal face portions, forming depressed pockets in the supported portions, arranging fillings within the pockets, applying an upper layer of dough to the supported downwardly inclined marginal face portions, subjecting the upper layer to a rolling action and a downward pressure for forming contacting faces while forming interfitting ribs upon the contacting faces which extend transversely of the faces, severing the superposed layers at the outer edge of the contacting faces, subjecting the severed superposed layers to a jarring action to free the same from the downwardly inclined supporting action, and separating out the formed ravioli by a downward movement from the supported position by the action of gravity.

MARIO VALDASTRI, Sr.